(No Model.)
L. GUTMANN.
ELECTRIC COMMUTATOR.
No. 419,660. Patented Jan. 21, 1890.
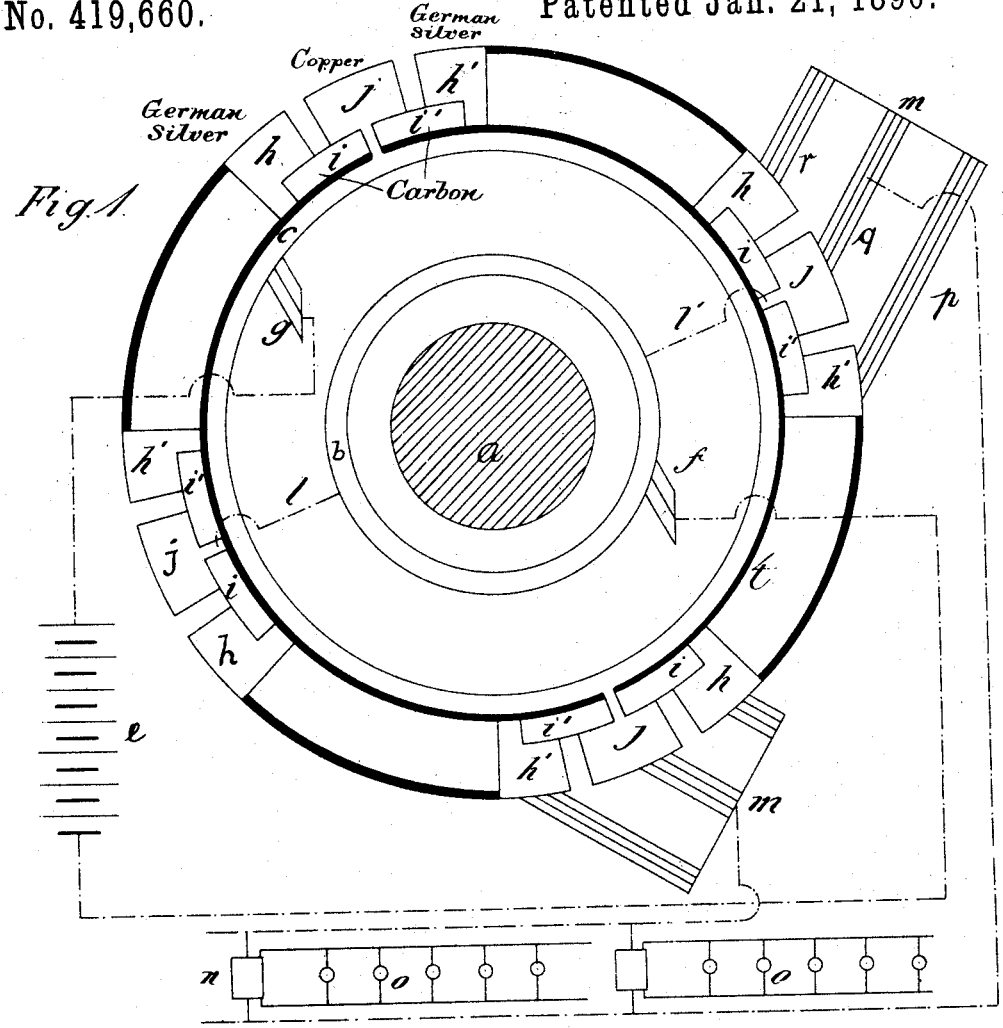
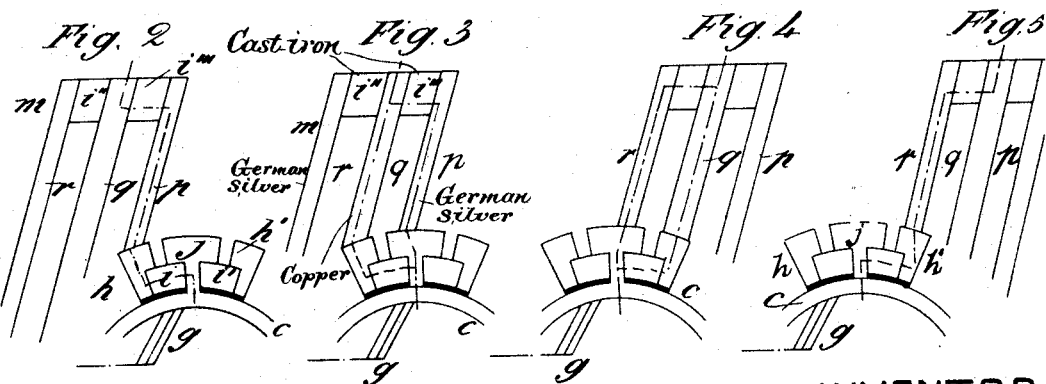
ATTEST,
Ferdinand Strick
Agnes T. Yates.
INVENTOR,
Ludwig Gutmann
by his Attorney
Edward P. Thompson.

UNITED STATES PATENT OFFICE.

LUDWIG GUTMANN, OF FORT WAYNE, INDIANA.

ELECTRIC COMMUTATOR.

SPECIFICATION forming part of Letters Patent No. 419,660, dated January 21, 1890.

Application filed September 18, 1888. Serial No. 285,758. (No model.)

*To all whom it may concern:*

Be it known that I, LUDWIG GUTMANN, a subject of the Emperor of Germany, and a resident of Fort Wayne, in the county of Allen and State of Indiana, have invented certain new and useful Improvements in Electric Commutators, of which the following is a specification.

My present invention relates to a device for converting continuous currents—such as are generated by primary or secondary batteries or by direct-current dynamos—into alternating currents similar to those which are generated by the ordinary type of alternating-current dynamo.

The object of the invention is to provide a commutator which will automatically change a continuous current into an alternating current of which each element or alternation consists of a current which increases gradually from zero to maximum and then falls back from maximum to zero. I find that such a commutator prevents sparking during each break, that the efficiency is higher than with a commutator which merely produces alternations, and that the current obtained may be employed with converters, and may be put to all the uses for which the alternating current of an alternating dynamo is employed.

The construction of the commutator, location of circuits, and mode of operation are exhibited in the following drawings, in which—

Figure 1 is a view in elevation of the commutator and brushes and electric circuits, the shaft of the commutator being shown in section; and Figs. 2, 3, 4, and 5 show different relative positions of the brush and the commutator-plates.

The commutator and circuits and electrical connections consist of the combination of a shaft $a$, two rings of conducting material $c$ and $b$ mounted thereon, a continuous-current generator $e$, whose terminals are respectively connected to the said rings by means of brush $f$ touching the ring $b$ and the brush $g$ in contact with the ring $c$, and four compound commutator-plates, each consisting of the following elements, in the order named: A conducting-plate $h$, of comparatively high resistance, such as German silver a conducting-plate of carbon $i$, or similar substance of high resistance, such as cast-iron, in contact with the plate $h$; a conducting-plate $j$ of low resistance, such as copper, in contact with the said carbon-plate, but not in direct contact with the plate $h$; a second carbon-plate $i'$ in contact with plate $j$, and a second German-silver plate $h'$ in contact with the plate $i$; the two opposite plates $j$ being in electrical contact with the ring $b$ by means of the conductors $l$ and $l'$, and the remaining opposite plates $j$ being in electrical contact with the ring $c$, and the heavy black curved lines in all the figures indicating electrical insulation, and there being provided ninety degrees from each other brushes $m$ in circuit with electric converters $n$ and translating devices $o$, and the shaft $a$ being adapted to rotate.

As far as the commutation or alternation of the current is concerned, the same may be explained by reference to Fig. 1, the current passing through the brush $f$, the ring $b$, the conductor $l'$, plates $j, i, i', h,$ and $h'$, one of the brushes $m$, the converters $n$, the other one of the brushes $m$, the plates $j, h, h', i, i'$, and $j$, (the current flowing in $h$ and $h'$, rejoining plate $j$ by way of plates $i$ and $i'$,) with which the said brush is in contact, the ring $c$, the terminal or brush $g$, the generator $e$, and then back to the point of starting—the brush $f$. When the shaft rotates ninety degrees, it may be noticed that the brushes $m$ become connected to the opposite poles of the battery from which they are shown connected in the position represented in Fig. 1.

By referring successively to Figs. 2, 3, 4, and 5, the path of the current may be followed, as the relative positions of the commutator plates and brushes $m$ change.

It may conveniently be mentioned here that each brush $m$ has three terminals $p, q,$ and $r$, separated by carbon or cast-iron pieces $i''$ and $i'''$, and that the terminals $p$ and $r$ are preferably constructed of a substance of comparatively high resistance, such as German silver.

In the position shown in Fig. 2 the current passes from the ring $c$, through the carbon plate $i$, through the German-silver plate $h$, through the German-silver plate or terminal $p$, through the carbon plate $i'''$, to the terminal $q$, and so on to the external circuit, the path described being indicated by the alternated fine line of dots and dashes. When the terminals $p$ first touched, the plate $h$ it is apparent that on account of a great resistance introduced into the circuit the current will at the start be weak. The action above is in reference to one of the brushes $m$; but it is evident that the same takes place also in regard to the other brush, thereby doubling the resistance which is introduced upon the completion of the circuit.

When the relative position becomes as shown in Fig. 3, the path is twofold, being through plate $i$, plate $h$, and terminal $q$, as to one path, and through plate $j$, terminal $p$, plate $i'''$, and terminal $q$, as to the other path. In this case the resistance is less than in the former positions. In Fig. 1 the current may pass through all the terminals $p$, $q$, and $r$, so that the resistance is minimum and practically zero. It may be easily seen from Figs. 4 and 5 that similar relative positions of brush and commutator plates occur with similar but opposite effects upon the current. The effects are that the resistance gradually increases instead of diminishing until the terminal $r$ leaves the plate $h'$. The result, then, of the rotation of the shaft is that a current is produced consisting of successive alternations of current, and that each element of the current rises from zero to maximum and then diminishes from maximum to zero, and that these graduations are not abrupt, but gradual.

It is evident to those versed in the art that the number of sections of the commutator need not be limited to four, but that they may be decreased to two, or increased to as large a number as will admit of practical construction. It is evident, also, that the number of resistance-plates forming each section of the commutator may be increased or diminished. In case of converting a current of high electro-motive force into an alternating current the plates $i$ and $i'$ should be of as high resistance as it is practical to make them.

By the use of my invention it becomes convenient to employ the alternating current for the purpose of electric lighting and the direct current for propelling electric motors. The commutator may be located at the central station or at one or more sub-stations. By rotating the commutator with a speed so that the same number of commutator-sections pass the brushes as the generator produces alternations, it will be evident that the current will be changed into a direct current by connecting the terminals of the circuit containing the alternating current to the brushes $m$.

I claim as my invention—

1. A commutator whose contact-plates are subdivided, and each said plate consists of a low-resistance conductor fixed between two conductors of high resistance.

2. A commutator whose contact-plates consist of electrical conductors of different resistances grouped in the following order, viz: a high-resistance conductor, a low-resistance conductor, a second high-resistance conductor in one group, a third high-resistance conductor, a second low-resistance conductor, and a fourth high-resistance conductor in another group, and so on, placed around and equally distant from a center common to all the said contact-points.

3. A commutator or pole-changer whose contact-plates are each subdivided, and consist of a good conducting terminal placed centrally and conducting terminals of inferior conducting capacity placed on either side and so arranged that on breaking contact by the brush the current is less than normal.

4. A commutator or pole-changer whose contact-plates consist of electrical conductors of different resistances, and so arranged as to present to the commutator-brushes contact-conductors of low resistance and again of high resistance, as and for the purpose described.

5. A commutator or pole-changer whose sections consist of electrical conductors of different electrical resistance, so organized that the central part of each commutator-section is of the least possible resistance practical in the art, while the two at each side thereof consist of high and equal resistance conductors.

6. An alternating and commutating device for electric currents, consisting of the combination of a commutator and brushes, both being formed of conducting substances whose resistances vary from low-resistance conductor to a higher-resistance conductor.

7. In a dynamo-electric generator commutator-brush, terminals consisting of electric conductors of different resistances arranged in the following order: a high-resistance conductor, a low-resistance conductor, and again a high-resistance conductor.

8. The combination of two sets of contact-plates connected in each set by cast-iron, and brushes, one bearing upon each set, both sets being in circuit with an electrical generator and in circuit with brushes which form the terminals of an external circuit and the sets being adapted to rotate about a common center.

In testimony that I claim the foregoing as my invention I have signed my name, in presence of two witnesses, this 3d day of September, 1888.

LUDWIG GUTMANN.

Witnesses:
WILLIAM C. RYAN,
PHILLIP L. KELLEY.